US009380067B2

(12) United States Patent
Xue et al.

(10) Patent No.: US 9,380,067 B2
(45) Date of Patent: Jun. 28, 2016

(54) IPS DETECTION PROCESSING METHOD, NETWORK SECURITY DEVICE, AND SYSTEM

(71) Applicant: Huawei Technologies Co., Ltd., Shenzhen (CN)

(72) Inventors: Zhihui Xue, Shenzhen (CN); Wu Jiang, Beijing (CN); Shiguang Li, Beijing (CN); Shiguang Wan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 14/317,278

(22) Filed: Jun. 27, 2014

(65) Prior Publication Data

US 2014/0317718 A1    Oct. 23, 2014

Related U.S. Application Data

(63) Continuation of application No. PCT/CN2012/081547, filed on Sep. 18, 2012.

(30) Foreign Application Priority Data

Dec. 27, 2011  (CN) .......................... 2011 1 0443289

(51) Int. Cl.
```
G06F 21/55   (2013.01)
H04L 29/06   (2006.01)
H04L 12/26   (2006.01)
```
(52) U.S. Cl.
CPC ............ H04L 63/1416 (2013.01); H04L 63/02 (2013.01); H04L 63/0263 (2013.01); H04L 63/1441 (2013.01); *H04L 43/026* (2013.01)

(58) Field of Classification Search
CPC . H04L 63/1416; H04L 63/1408; H04L 63/20; H04L 63/1441; H04L 63/145; H04L 63/1458; H04L 63/0263; G06F 21/554
See application file for complete search history.

(56) References Cited

U.S. PATENT DOCUMENTS 6,279,113 B1 * 8/2001 Vaidya ................ H04L 63/1416
709/229
6,415,321 B1 * 7/2002 Gleichauf ............... H04L 12/24
709/224

(Continued)

FOREIGN PATENT DOCUMENTS

| CN | 1599334 A | 3/2005 |
|---|---|---|
| CN | 101695031 A | 4/2010 |

(Continued)

OTHER PUBLICATIONS

Thomas Karagiannis, Konstantina Papagiannaki, and Michalis Faloutsos. 2005. BLINC: multilevel traffic classification in the dark. In Proceedings of the 2005 conference on Applications, technologies, architectures, and protocols for computer communications (SIGCOMM '05). ACM, New York, NY, USA, 229-240.*

(Continued)

*Primary Examiner* — Jason K. Gee
*Assistant Examiner* — Zhimei Zhu
(74) *Attorney, Agent, or Firm* — Conley Rose, P.C.; Grant Rodolph (57) ABSTRACT

An IPS detection processing method, a network security device and a system are disclosed. The method includes: determining, by a network security device, whether an internal network device is a client or a server; if the internal network device is the client, simplifying an IPS signature rule base to obtain an IPS signature rule base corresponding to the client, or if the internal network device is the server, simplifying the IPS signature rule base to obtain an IPS signature rule base corresponding to the server; generating a state machine according to a signature rule in the IPS signature rule base obtained through simplifying processing; and performing IPS detection on flowing-through traffic by applying the state machine. In embodiments of the present invention, the network security device performs IPS detection by adopting the state machine with a redundant state removed, thereby improving IPS detection efficiency.

16 Claims, 5 Drawing Sheets

(56) References Cited

U.S. PATENT DOCUMENTS

| | | | | |
|---|---|---|---|---|
| 6,499,107 | B1* | 12/2002 | Gleichauf | H04L 12/2602 726/1 |
| 7,058,821 | B1* | 6/2006 | Parekh | H04L 63/145 713/194 |
| 7,624,084 | B2* | 11/2009 | Chesla | H04L 63/168 706/46 |
| 7,716,742 | B1* | 5/2010 | Roesch | H04L 67/125 726/25 |
| 7,944,822 | B1* | 5/2011 | Nucci | H04L 41/142 370/229 |
| 8,180,916 | B1* | 5/2012 | Nucci | H04L 43/028 709/223 |
| 8,448,249 | B1* | 5/2013 | Preston | H04L 63/1416 709/223 |
| 2004/0250124 | A1* | 12/2004 | Chesla | G06F 21/552 726/13 |
| 2004/0250134 | A1* | 12/2004 | Kohler, Jr. | H04L 63/1425 726/23 |
| 2006/0174107 | A1 | 8/2006 | Furlong et al. | |
| 2007/0124577 | A1* | 5/2007 | Nielsen | H04L 63/0227 713/151 |
| 2008/0123545 | A1* | 5/2008 | Watanabe | H04L 43/026 370/252 |
| 2009/0178139 | A1* | 7/2009 | Stute | H04L 63/1433 726/22 |
| 2010/0124182 | A1* | 5/2010 | Han | H04L 43/04 370/253 |

FOREIGN PATENT DOCUMENTS

| | | |
|---|---|---|
| CN | 101707601 A | 5/2010 |
| CN | 101778012 A | 7/2010 |
| CN | 101834760 A | 9/2010 |
| CN | 102457415 A | 5/2012 |
| EP | 2214115 A1 | 8/2010 |

OTHER PUBLICATIONS

Scarfone, K., et al., "Guide to Intrusion Detection and Prevention Systems (IDPS)," Part 1, National Institute of Standards and Technology, Special Publication 800-94, XP002617883, Feb. 2007, 84 pages.

"Guide to Intrusion Detection and Prevention Systems (IDPS)," Part 2, National Institute of Standards and Technology, Special Publication 800-94, XP002617883, Feb. 2007, 43 pages.

Foreign Communication From a Counterpart Application, European Application No. 12863309.6, Extended European Search Report dated Nov. 3, 2014, 5 pages.

Foreign Communication From a Counterpart Application, PCT Application No. PCT/CN2012/081547, English Translation of International Search Report dated Nov. 29, 2012, 2 pages.

Foreign Communication From a Counterpart Application, PCT Application No. PCT/CN2012/081547, Written Opinion dated Nov. 29, 2012, 5 pages.

Partial English Translation and Abstract of Chinese Patent Application No. CN101778012A, May 29, 2014, 5 pages.

Partial English Translation and Abstract of Chinese Patent Application No. CN1599334A, May 29, 2014, 6 pages.

Partial English Translation and Abstract of Chinese Patent Application No. CN101834760A, May 29, 2014, 6 pages.

Wang, J., et al., "Complete Rule Base of Intrusion Prevention System," Computer Engineering and Applications, vol. 45, No. 9, 2009, pp. 88-99.

English Translation of Wang, J., et al., "Complete Rule Base of Intrusion Prevention System," Computer Engineering and Applications, vol. 45, No. 9, 2009, pp. 88-99.

* cited by examiner

IPS DETECTION PROCESSING METHOD, NETWORK SECURITY DEVICE, AND SYSTEM

CROSS-REFERENCE TO RELATED APPLICATIONS

This application is a continuation of International Application No. PCT/CN2012/081547, filed on Sep. 18, 2012, which claims priority to Chinese Patent Application No. 201110443289.0, filed on Dec. 27, 2011, both of which are hereby incorporated by reference in their entireties.

TECHNICAL FIELD

Embodiments of the present invention relate to an intrusion prevention system (IPS) detection technology, and in particular, to an IPS detection processing method, a network security device, and a system.

BACKGROUND

An IPS, being a system for preventing network traffic threats, is capable of correctly identifying and preventing threats in a network, for example, worms, Trojans, bots, and other system vulnerabilities. The IPS may be deployed on a device such as a firewall to perform security defense on a client or a server.

Specifically, a signature rule base is saved on an existing IPS device, and the signature rule base stores characteristic information that is extracted by analyzing threat traffic in the network in advance, where the characteristic information is signature rules. When performing IPS defense, the IPS device may compile all the signature rules in the signature rule base into a state machine. When the IPS device performs detection on the network traffic, the IPS device may compare characteristics of the network traffic with each state in the state machine to determine whether the network traffic is the threat traffic, and perform security defense for the defense object.

However, with the characteristic information of the threat traffic continuously increased, the number of the signature rules stored in the signature rule base also keeps increasing, so that the generated state machine is relatively gigantic, thereby lowering detection efficiency when the IPS detection is performed on the network traffic.

SUMMARY

Embodiments of the present invention provide an IPS detection processing method, a network security device, and a system to improve detection efficiency during IPS detection.

An embodiment of the present invention provides an IPS detection processing method, including: determining, by a network security device, whether an internal network device is a client or a server, where the network security device is deployed between the internal network device and an external network device, and is configured to protect security of the internal network device; if the internal network device is the client, simplifying, by the network security device, an IPS signature rule base to obtain an IPS signature rule base corresponding to the client, or if the internal network device is the server, simplifying the IPS signature rule base to obtain an IPS signature rule base corresponding to the server; and generating, by the network security device, a state machine according to a signature rule in the IPS signature rule base obtained through simplifying processing, and performing IPS detection on flowing-through traffic by applying the state machine.

An embodiment of the present invention provides a network security device, which is deployed between an internal network device and an external network device and is configured to protect security of the internal network device, and the network security device includes: a determining module configured to determine whether the internal network device is a client or a server; a rule base processing module configured to: if the determining module determines that the internal network device is the client, simplify an IPS signature rule base to obtain an IPS signature rule base corresponding to the client, or if the determining module determines that the internal network device is the server, simplify the IPS signature rule base to obtain an IPS signature rule base corresponding to the server; and a traffic detecting module configured to generate a state machine according to a signature rule in the IPS signature rule base obtained through simplifying processing, and perform IPS detection on flowing-through traffic by applying the state machine.

An embodiment of the present invention provides a network security system, including a client, a server, and a network security device connected to the client and the server, where the network security device adopts the preceding network security device.

In embodiments of the present invention, the network security device may determine whether the internal network device protected by the network security device is the client or the server, may simplify the IPS signature rule base according to a determination result, and generates the state machine according to the IPS signature rule base obtained through simplifying to perform IPS detection by adopting the state machine after a redundant state is removed, thereby improving IPS detection efficiency.

BRIEF DESCRIPTION OF DRAWINGS

To describe the technical solutions in the embodiments of the present invention more clearly, the following briefly introduces accompanying drawings required for describing the embodiments. The accompanying drawings in the following description show merely some embodiments of the present invention, and a person of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
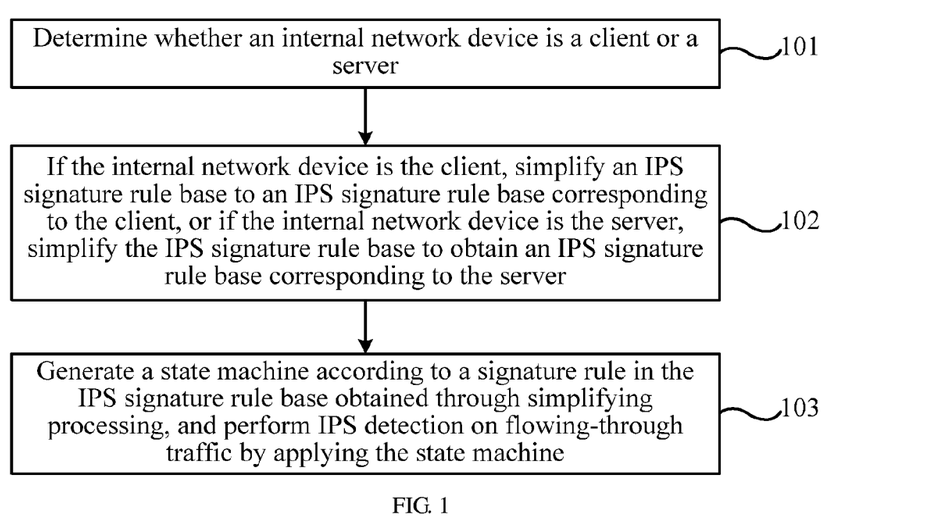
FIG. 1 is a flowchart of Embodiment 1 of an IPS detection processing method according to the present invention.

FIG. 1 is a flowchart of Embodiment 1 of an IPS detection processing method according to the present invention, and as shown in FIG. 1, the method of this embodiment may include:

Step 101: Determine whether an internal network device is a client or a server.

A network security device, for example, a firewall, may determine whether the internal network device is the client or the server.

Specifically, the network security device generally performs IPS detection on the internal network device. However, in the prior art, during delivery, the network security device does not differentiate whether the internal network device to be protected by the network security device is the client or the server, so that signature rules included in an IPS signature rule base preset in the network security device not only include signature rules for the client and but also include signature rules for the server. Therefore, in a situation that the internal network device is the client, the signature rule corresponding to the server in the existing IPS signature rule base is redundant, and in a situation that the internal network device is the server, the signature rule corresponding to the client in the existing IPS signature rule base is redundant. Based on the existing gigantic IPS signature rule base, states in a state machine generated by the network security device correspondingly have redundancy, so that when comparison is performed between traffic characteristic information and each state in the state machine, comparison efficiency is relatively low, that is, IPS detection efficiency is relatively low.

Therefore, in this embodiment, after being deployed, the network security device needs to differentiate whether the internal network device protected by the network security device is the client or the server to perform differentiated processing on an IPS signature rule base corresponding to the client and an IPS signature rule base corresponding to the server in the IPS signature rule base. The specific implementation solution in which the network security device determines whether the internal network device is the client or the server may be flexibly designed. For example, after the network security device is deployed, the network security device may determine, according to set identification information, whether the internal network device is the client or the server in a currently deployed scenario. Or, the network security device may determine whether the internal network device is the client or the server through testing, for example, the network security device attempts to send various service request messages to the internal network device, if a response message can be obtained, the network security device determines that the internal network device is the server, otherwise, the internal network device is the client; in addition, the network security device may also determine, according to feedback information, whether the internal network device is the client or the server by sending a network management command. A specific implementation solution that the network security device differentiates whether the internal network device is the client or the server is not limited in this embodiment.

Step 102: If the internal network device is the client, simplify the IPS signature rule base to obtain the IPS signature rule base corresponding to the client, or if the internal network device is the server, simplify the IPS signature rule base to obtain the IPS signature rule base corresponding to the server.

When determining that the internal network device is the client, the network security device simplifies the existing IPS signature rule base to obtain the IPS signature rule base corresponding to the client. For the signature rule corresponding to the server in the IPS signature rule base, a deletion processing manner may be adopted, and a deactivation processing manner may also adopted, where compared with the deletion manner, in the deactivation manner, the network security device may also be subsequently deployed in an activation manner in a scenario where the internal network device is the server.

When determining that the internal network device is the server, the network security device simplifies the existing IPS signature rule base to obtain the IPS signature rule base corresponding to the server. For the signature rule corresponding to the client in the IPS signature rule base, a deletion processing manner may be adopted, and a deactivation processing manner may also adopted, where compared with the deletion manner, in the deactivation manner, the network security device may also be subsequently deployed in the activation manner in a scenario where the internal network device is the client.

Step 103: Generate a state machine according to a signature rule in the IPS signature rule base obtained through simplifying processing, and perform IPS detection on flowing-through traffic by applying the state machine.

Compared with that the network security device generates the state machine by adopting all signature rules in the IPS signature rule base, in this embodiment, the network security device may generate the state machine by adopting the signature rule in the IPS signature rule base obtained through simplifying processing. Specifically, if the internal network device is the client, the network security device may generate the state machine by adopting the signature rule in the IPS signature rule base corresponding to the client, and if the internal network device is the server, the network security device generates the state machine by adopting the signature rule in the IPS signature rule base corresponding to the server. It may be known that in the state machine generated by the network security device by using the method of this embodiment, a redundant state of the prior art is removed.

When performing the IPS detection on the traffic flowing through the network security device, the network security device adopts the state machine with the redundant state removed, that is, the traffic characteristic information is compared with each state in the state machine with the redundant state removed, thereby improving comparison efficiency and correspondingly improving IPS detection efficiency.

In this embodiment, the network security device may determine whether the internal network device protected by the network security device is the client or the server, simplifies the IPS signature rule base according to a determination result, and generates the state machine according to the IPS signature rule base obtained through simplifying to perform the IPS detection by adopting the state machine with the redundant state removed, thereby improving the IPS detection efficiency.

The traffic from the client to the server through the network security device is different from the traffic from the server to the client through the network security device in the traffic characteristic, so that when Embodiment 1 shown in FIG. 1 is implemented, the network security device may determine whether the internal network device is the client or the server by referring to traffic information flowing through the network security device. Specifically, step 101 shown in FIG. 1 may be that: perform statistical processing on the flowing-through traffic information, obtain traffic characteristic information, and then determine whether the internal network device is the client or the server according to the traffic characteristic information.

Figure 2:
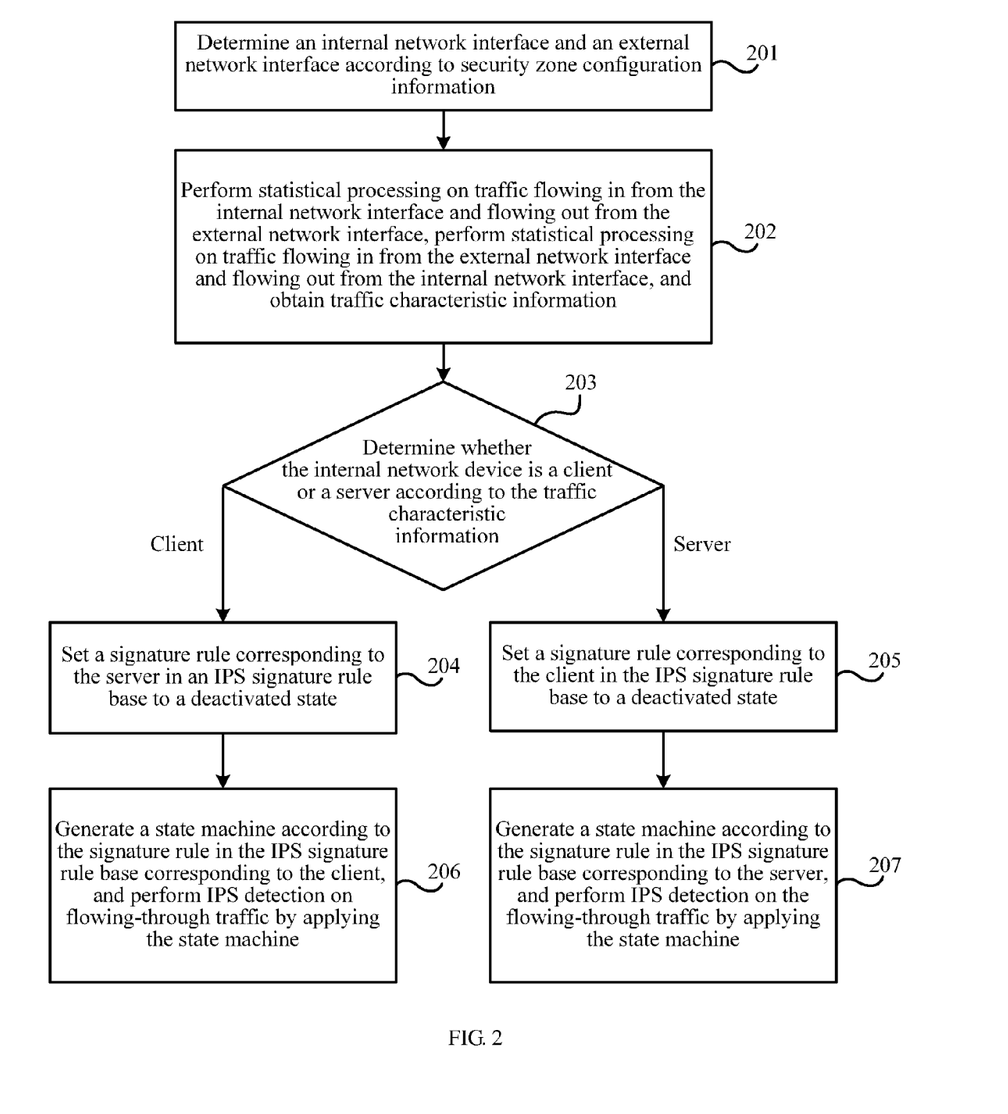
FIG. 2 is a flowchart of Embodiment 2 of an IPS detection processing method according to the present invention.

FIG. 2 is a flowchart of Embodiment 2 of an IPS detection processing method according to the present invention, and as shown in FIG. 2, the method of this embodiment may include:

Step 201: Determine an internal network interface and an external network interface according to security zone configuration information.

Specifically, a network security device, for example, a firewall, has the following several security domains by default: a local domain, a trust domain, an untrust domain, and a demilitarized zone (DMZ domain). Generally, a zone with a relatively high security level requirement may be deployed in the Trust domain, and a zone with a relatively low security level requirement may be deployed in the UnTrust domain. A security level requirement of an internal network is relatively high, so that an internal network device needs to be deployed in the Trust domain, and an external network device may be deployed in the UnTrust domain, the deployment information may be recorded in the security zone configuration information of the network security device when a user performs network deployment. For example, the network security device has two interfaces, namely, an interface 1 and an interface 2, and the network security device may know, according to the security zone configuration information stored in the network security device, that the interface 1 is configured as the Trust domain, and the interface 2 is configured as the UnTrust domain, so the network security device may know that the interface 1 is the internal network interface, and the interface 2 is the external network interface.

Step 202: Perform statistical processing on traffic flowing in from the internal network interface and flowing out from the external network interface, perform statistical processing on traffic flowing in from the external network interface and flowing out from the internal network interface, and obtain traffic characteristic information.

After determining that the interface 1 is the internal network interface and the interface 2 is the external network interface, the network security device may perform the statistical processing on the traffic flowing in from the interface 1 and flowing out from the interface 2, that is, traffic sent from the internal network device to the external network device, and may further perform the statistical processing on the traffic flowing in from the interface 2 and flowing out from the interface 1, that is, traffic sent from the external network device to the internal network device to obtain the traffic characteristic information of all the traffic flowing through the network security device.

It should be noted that persons skilled in the art may set statistics time according to a requirement, which is not limited in this embodiment.

Step 203: Determine whether the internal network device is a client or a server according to the traffic characteristic information, if the internal network device is the client, execute step 204, and if the internal network device is the server, execute step 205.

After obtaining the traffic characteristic information, the network security device may determine whether the internal network device is the client or the server according to the traffic characteristic information, that is, whether the device to be protected by the network security device is the client or the server. The traffic characteristic information may include a traffic size, a protocol type of traffic, and a port through which the traffic flows, which are not limited in this embodiment.

Specifically, the traffic sent from the client to the server may be different from the traffic sent from the server to the client in characteristics such as the traffic size, protocol type of traffic, and port through which the traffic flows. For example, generally, a size of the traffic sent from the client to server is greater than that of the traffic sent from the server to the client, and the protocol type of the traffic flowing out from the client may be different from the protocol type of the traffic flowing out from the server. Therefore, in this embodiment, the network security device may separately adopt the characteristic information for judgment, and may combine all characteristic information for judgment. Apparently, accuracy of judgment performed in combination with all the characteristic information is relatively high.

Step 204: Set a signature rule corresponding to the server in the IPS signature rule base to a deactivated state, and execute step 206.

If the network security device determines that the internal network device is the client in step 203, the network security device may set the signature rule corresponding to the server in the IPS signature rule base to the deactivated state to keep only the signature rule corresponding to the client in an activated state.

Step 205: Set a signature rule corresponding to the client in the IPS signature rule base to a deactivated state, and execute step 207.

If the network security device determines that the internal network device is the server in step 203, the network security device may set the signature rule corresponding to the client in the IPS signature rule base to the deactivated state to keep only the signature rule corresponding to the server in the activated state.

Step 206: Generate a state machine according to the signature rule in the IPS signature rule base corresponding to the client, and perform IPS detection on flowing-through traffic by applying the state machine.

Step 207: Generate a state machine according to the signature rule in the IPS signature rule base corresponding to the server, and perform IPS detection on flowing-through traffic by applying the state machine.

An implementation process of step 206 and step 207 is already described in detail in the embodiment shown in FIG. 1, and details are not repeatedly described herein.

In this embodiment, the network security device may determine the internal network interface and the external network interface according to the security zone configuration information, and further determine whether the internal network device is the client or the server through the flowing-through traffic characteristic information, simplify the IPS signature rule base according to the determination result, and generate the state machine according to the IPS signature rule base obtained through simplifying to perform the IPS detection by adopting the state machine with the redundant state removed, thereby improving the IPS detection efficiency.

The following adopts two specific embodiments to describe the technical solution of the present invention in detail.

Figure 3:
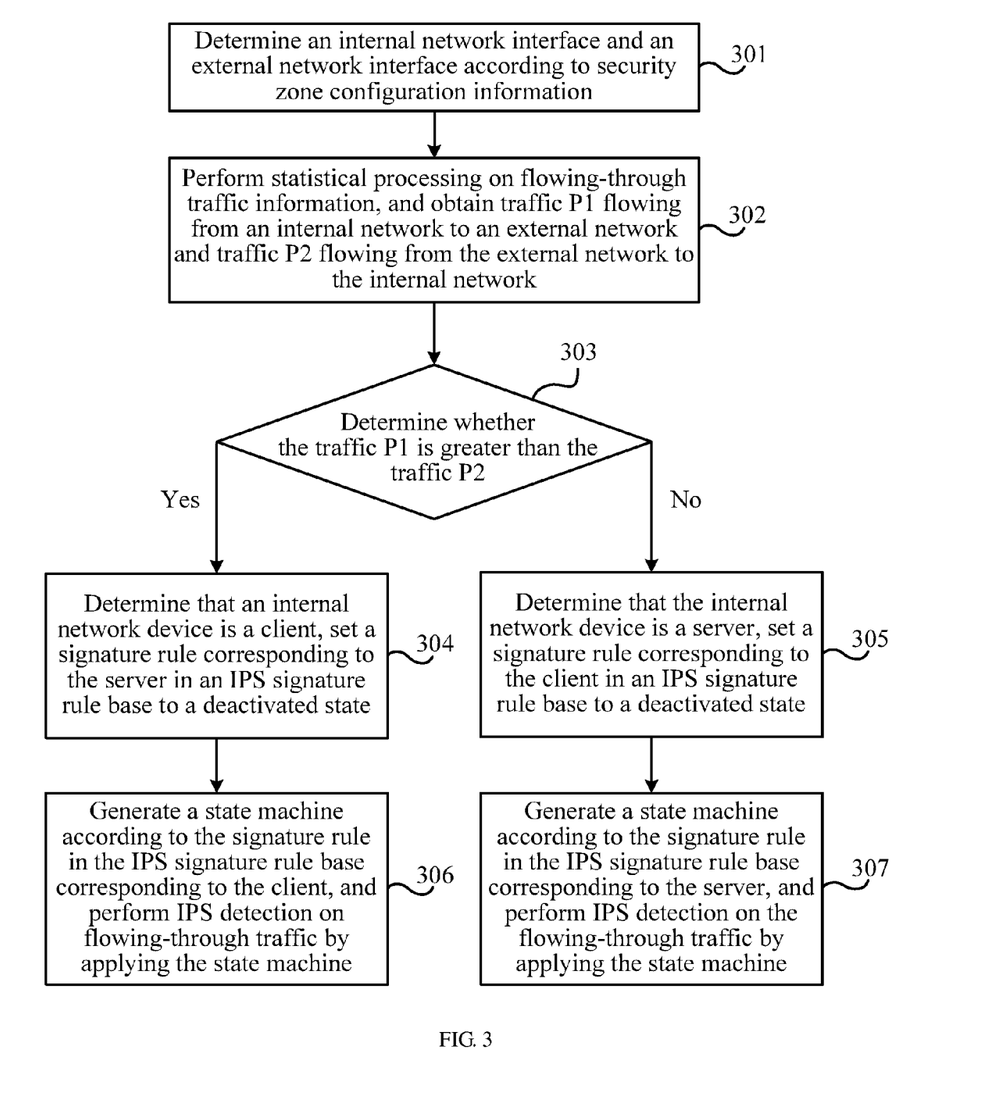
FIG. 3 is a flowchart of Embodiment 3 of an IPS detection processing method according to the present invention.

FIG. 3 is a flowchart of Embodiment 3 of an IPS detection processing method according to the present invention, and as shown in FIG. 3, in this embodiment, step 203 in the method embodiment shown in FIG. 2 is detailed, and the method of this embodiment may include:

Step 301: Determine an internal network interface and an external network interface according to security zone configuration information.

Step 302: Perform statistical processing on flowing-through traffic information, and obtain traffic P1 flowing from an internal network to an external network and traffic P2 flowing from the external network to the internal network.

Step 303: Determine whether the traffic P1 is greater than the traffic P2, and if yes, execute step 304, otherwise, execute step 305.

Step 304: Determine that an internal network device is a client, set a signature rule corresponding to the server in an IPS signature rule base to a deactivated state, and execute step 306.

Step 305: Determine that an internal network device is a server, set a signature rule corresponding to the client in an IPS signature rule base to a deactivated state, and execute step 307.

Generally, the server may not actively initiate a traffic sending behavior, so that traffic from the client to the server is greater than traffic from the server to the client. Therefore, if a statistical result of the network security device is P1>P2, it is determined that the internal network device is the client, and if P1≤P2, it may be determined that the internal network device is the server.

Step 306: Generate a state machine according to the signature rule in the IPS signature rule base corresponding to the client, and perform IPS detection on flowing-through traffic by applying the state machine.

Step 307: Generate a state machine according to the signature rule in the IPS signature rule base corresponding to the server, and perform IPS detection on flowing-through traffic by applying the state machine.

In this embodiment, the network security device may determine the internal network interface and the external network interface according to the security zone configuration information, and further determine whether the internal network device is the client or the server by determining the size of the traffic flowing from the internal network to the external network and the traffic flowing from the external network to the internal network, simplify the IPS signature rule base according to the determination result, and generate the state machine according to the IPS signature rule base obtained through simplifying to perform the IPS detection by adopting the state machine with the redundant state removed, thereby improving the IPS detection efficiency.

Figure 4:
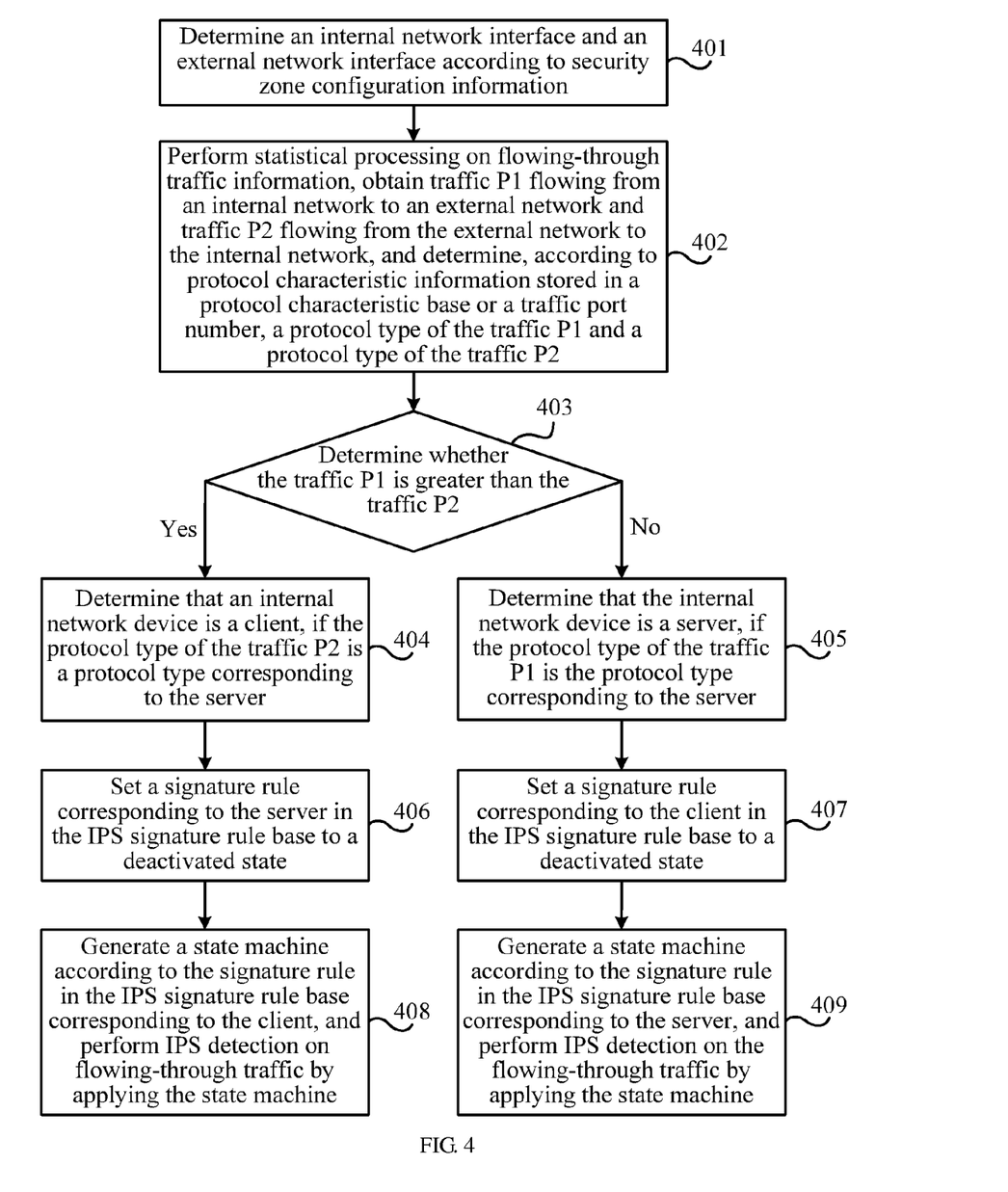
FIG. 4 is a flowchart of Embodiment 4 of an IPS detection processing method according to the present invention.

FIG. 4 is a flowchart of Embodiment 4 of an IPS detection processing method according to the present invention, and as shown in FIG. 4, in this embodiment, step 203 in the method embodiment shown in FIG. 2 is detailed, and the method of this embodiment may include:

Step 401: Determine an internal network interface and an external network interface according to security zone configuration information.

Step 402: Perform statistical processing on flowing-through traffic information, obtain traffic P1 flowing from an internal network to an external network and traffic P2 flowing from the external network to the internal network, and determine, according to protocol characteristic information stored in a protocol characteristic base or a traffic port number, a protocol type of the traffic P1 and a protocol type of the traffic P2.

Step 403: Determine whether the traffic P1 is greater than the traffic P2, and if yes, execute step 404, otherwise, execute step 405.

Step 404: If the protocol type of the traffic P2 is a protocol type corresponding to the server, determine that an internal network device is a client, and execute step 406.

Step 405: If the protocol type of the traffic P1 is a protocol type corresponding to the server, determine that an internal network device is a server, and execute step 407.

Specifically, the protocol types supported by the server and the client are different. For a file transfer protocol (FTP), except an FTP packet, the server generally does not actively send a packet, so that under a situation that the traffic P1 is greater than the traffic P2, if the protocol type of the traffic P2 is the FTP, it is determined that the external network device is the server, and the internal network device is the client. Under the situation that the P2 is greater than the P1, if the protocol type of the traffic P1 is only the FTP, it is determined that the internal network device is the server, and the external network device is the client.

In specific implementation, some application protocols may also use a default port number, for example, a port number adopted by a hypertext transfer protocol (HTTP) is 80, and a port number adopted by the FTP is 21, so that the network security device may determine the protocol type corresponding to the traffic according to the port number of the traffic. However, some application protocols may not use a default port. In this case, the protocol type of the traffic needs to be identified through the protocol characteristic base.

Step 406: Set a signature rule corresponding to the server in the IPS signature rule base to a deactivated state, and execute step 408.

Step 407: Set a signature rule corresponding to the client in the IPS signature rule base to a deactivated state, and execute step 409.

Step 408: Generate a state machine according to the signature rule in the IPS signature rule base corresponding to the client, and perform IPS detection on flowing-through traffic by applying the state machine.

Step 409: Generate a state machine according to the signature rule in the IPS signature rule base corresponding to the server, and perform IPS detection on flowing-through traffic by applying the state machine.

In this embodiment, the network security device may determine the internal network interface and the external network interface according to the security zone configuration information, and further determine whether the internal network device is the client or the server by determining the size of the traffic flowing from the internal network to the external network and the traffic flowing from the external network to the internal network and the protocol type of the traffic, simplify the IPS signature rule base according to the determination result, and generate the state machine according to the IPS signature rule base obtained through simplifying to perform the IPS detection by adopting the state machine with the redundant state removed, thereby improving the IPS detection efficiency.

Figure 5:
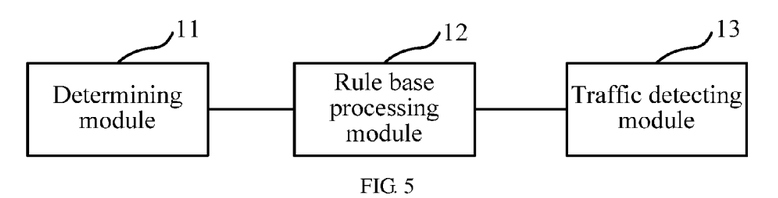
FIG. 5 is a schematic structural diagram of Embodiment 1 of a network security device according to the present invention.

FIG. 5 is a schematic structural diagram of Embodiment 1 of a network security device according to the present invention, and as shown in FIG. 5, the device of this embodiment may include: a determining module 11, a rule base processing module 12, and a traffic detecting module 13, where the determining module is configured to determine whether an internal network device is a client or a server; the rule base processing module 12 is configured to: if the determining module 11 determines that the internal network device is the client, simplify an IPS signature rule base to obtain an IPS signature rule base corresponding to the client, or if the determining module 12 determines that the internal network device is the server, simplify the IPS signature rule base to obtain an IPS signature rule base corresponding to the server; and the traffic detecting module 13 is configured to generate a state machine according to a signature rule in the IPS signature rule base obtained through simplifying processing, and perform IPS detection on flowing-through traffic by applying the state machine.

The network security device of this embodiment is configured to execute the technical solution of the method embodiment shown in FIG. 1, implementation principles and technical effects are similar, and therefore details are not repeatedly described herein.

Figure 6:
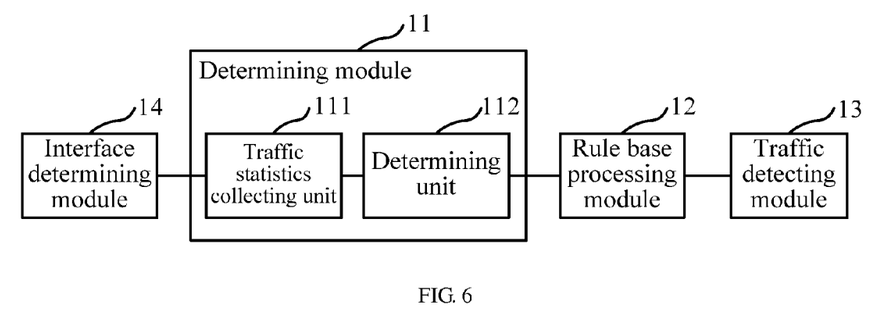
FIG. 6 is a schematic structural diagram of Embodiment 2 of a network security device according to the present invention.

FIG. 6 is a schematic structural diagram of Embodiment 2 of a network security device according to the present invention, and as shown in FIG. 6, on a basis of a structure of the device shown in FIG. 5, the device of this embodiment further includes: an interface determining module 14, and the determining module 11 may further include: a traffic statistics collecting unit 111 and a determining unit 112, where the interface determining module 14 is configured to determine an internal network interface and an external network interface according to security zone configuration information; the traffic statistics collecting unit 111 is configured to perform statistical processing on flowing-through traffic information, and obtain traffic characteristic information, specifically, the traffic statistics collecting unit 111 is configured to perform the statistical processing on traffic flowing in from the internal network interface and flowing out from the external network interface, and perform the statistical processing on traffic flowing in from the external network interface and flowing out from the internal network interface; the determining unit 112 is configured to determine whether the internal network device is the client or the server according to the traffic characteristic information obtained by the traffic statistics collecting unit 111. The rule base processing module 12 is configured to set a signature rule corresponding to the server in the IPS signature rule base to a deactivated state, or set a signature rule corresponding to the client in the IPS signature rule base to a deactivated state.

The network security device of this embodiment is configured to execute the technical solution of the method embodiment shown in FIG. 2, implementation principles and technical effects are similar, and therefore details are not repeatedly described herein.

In Embodiment 3 of the network security device of the present invention, the structure of the device shown in FIG. 6 may be adopted. In this embodiment, on the basis of Embodiment 2 of the network security device shown in FIG. 6, the traffic statistics collecting unit 111 is configured to perform the statistical processing on the flowing-through traffic information, and obtain traffic P1 flowing from an internal network to an external network and traffic P2 flowing from the external network to the internal network; the determining unit 12 is configured to: if the traffic P1 is greater than the traffic P2, determine that the internal network device is the client, and if the traffic P1 is smaller than or equal to the traffic P2, determine that the internal network device is the server.

The network security device of this embodiment is configured to execute the technical solution of the method embodiment shown in FIG. 3, implementation principles and technical effects are similar, and therefore details are not repeatedly described herein.

Figure 7:
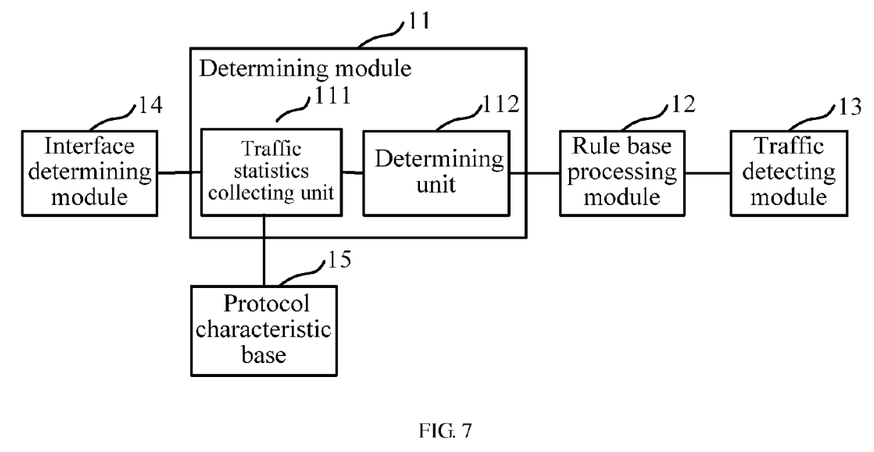
FIG. 7 is a schematic structural diagram of Embodiment 4 of a network security device according to the present invention.

FIG. 7 is a schematic structural diagram of Embodiment 4 of a network security device according to the present invention, and as shown in FIG. 7, on a basis of a structure of the device shown in FIG. 6, the device of this embodiment further includes: a protocol characteristic base 15 configured to store protocol characteristic information of protocols; the traffic statistics collecting unit 111 is configured to perform the statistical processing on the flowing-through traffic information, obtain traffic P1 flowing from an internal network to an external network and traffic P2 flowing from the external network to the internal network, and determine, according to the protocol characteristic information stored in the protocol characteristic base or a traffic port number, a protocol type of the traffic P1 and a protocol type of the traffic P2; the determining unit 112 is configured to determine that the internal network device is the client, if the traffic P1 is greater than the traffic P2 and the protocol type of the traffic P2 is a file transfer protocol, and determine that the internal network device is the server, if the traffic P1 is smaller than or equal to the traffic P2 and the protocol type of the traffic P1 is the file transfer protocol.

The network security device of this embodiment is configured to execute the technical solution of the method embodiment shown in FIG. 4, implementation principles and technical effects are similar, and therefore details are not repeatedly described herein.

Figure 8:
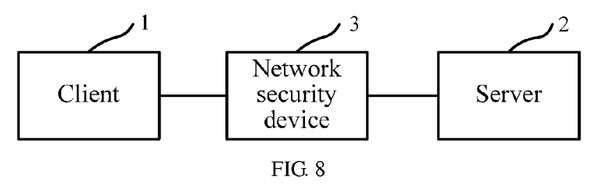
FIG. 8 is a schematic structural diagram of an embodiment of a network security system according to the present invention.

FIG. 8 is a schematic structural diagram of an embodiment of a network security system according to the present invention, and as shown in FIG. 8, the system of this embodiment may include: a client 1, a server 2, and a network security device 3 connected to the client 1 and the server 2, where the network security device 3 may adopt the structures of Embodiment 1 to Embodiment 4 of the network security device, and is correspondingly configured to execute the technical solutions of the method embodiments of FIG. 1 to FIG. 4, implementation principles and technical effects are similar, and therefore details are not repeatedly described herein.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps of the foregoing method embodiments are performed. The foregoing storage medium includes various mediums capable of storing program code, such as a read-only memory (ROM), a random access memory (RAM), a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, a person of ordinary skill in the art should understand that he may still make modifications to the technical solutions recorded in the foregoing embodiments, or make equivalent replacements to part of technical features of the technical solutions recorded in the foregoing embodiments, however, these modifications or replacements do not make the essence of the corresponding technical solutions depart from the scope of the technical solutions of the embodiments of the present invention.

What is claimed is:

1. An intrusion prevention system (IPS) detection processing method performed by a network security device deployed between an internal network device and an external network device to protect security of the internal network device, wherein the networking role of the internal network device comprises one of a server and a client wherein the external network device is a client accessing a service provided by the internal network device when the networking role played by the internal network device is the server, wherein the external network device is a server providing the service accessed by the internal network device when the networking role played by the internal network device is the client, and wherein the method comprises:

performing statistical processing on traffic information that flows through the network security device;

obtaining traffic characteristic information from the statistical processing on the traffic information that flows through the network security device, wherein the traffic characteristic information comprises traffic P1 flowing from an internal network to an external network and traffic P2 flowing from the external network to the internal network;

determining whether the networking role of the internal network device is the client or the server by comparing a size of the traffic P1 and a size of the traffic P2;

constructing, from a full IPS signature rule base of the network security device, a simplified IPS signature rule base according to the networking role of the internal network device, wherein the full IPS signature rule base includes signature rules pertaining to the networking role of the internal network device and signature rules not pertaining to the networking role of the internal network device, and wherein the simplified IPS signature rule base contains only the signature rules pertaining to the networking role of the internal network device;

generating a state machine according to signature rules in the simplified IPS signature rule base; and performing IPS detection by applying the state machine to traffic flowing through the network security device, wherein the traffic comprises traffic sent from the internal network device to the external network device and traffic sent from the external network device to the internal network device.

2. The method according to claim 1, wherein before performing statistical processing on the traffic information that flows through the network security device, the method further comprises determining an internal network interface and an external network interface according to security zone configuration information of the network security device, and wherein performing statistical processing on the traffic information that flows through the network security device comprises:

performing the statistical processing on traffic flowing in from the internal network interface and flowing out from the external network interface, to obtain the traffic P1; and performing the statistical processing on traffic flowing in from the external network interface and flowing out from the internal network interface to obtain the traffic P2.

3. The method according to claim 2, wherein determining whether the networking role of the internal network device is the client or the server by comparing the size of the traffic P1 and the size of the traffic P2 comprises:

determining that the networking role of the internal network device is the client when the size of the traffic P1 is greater than the size of the traffic P2; and determining that the networking role of the internal network device is the server when the size of the traffic P1 is smaller than or equal to the size of the traffic P2.

4. The method according to claim 2, wherein the traffic characteristic information comprises a protocol type of the traffic P1 and a protocol type of the traffic P2, wherein obtaining the traffic characteristic information comprises determining, according to protocol characteristic information stored in a protocol characteristic base or a traffic port number, a protocol type of the traffic P1 and a protocol type of the traffic P2, and wherein determining whether the networking role of the internal network device is the client or the server by comparing the size of the traffic P1 and the size of the traffic P2 comprises:

determining that the networking role of the internal network device is the client when the size of the traffic P1 is greater than the size of the traffic P2 and the protocol type of the traffic P2 is a protocol type corresponding to the server; and determining that the networking role of the internal network device is the server when the size of the traffic P1 is smaller than or equal to the size of the traffic P2 and the protocol type of the traffic P1 is the protocol type corresponding to the server.

5. The method according to claim 1, wherein determining whether the networking role of the internal network device is the client or the server by comparing the size of the traffic P1 and the size of the traffic P2 comprises:

determining that the networking role of the internal network device is the client when the size of the traffic P1 is greater than the size of the traffic P2; and determining that the networking role of the internal network device is the server when the of the traffic P1 is smaller than or equal to the size of the traffic P2.

6. The method according to claim 1, wherein the traffic characteristic information comprises a protocol type of the traffic P1 and a protocol type of the traffic P2 wherein obtaining the traffic characteristic information comprises determining, according to protocol characteristic information stored in a protocol characteristic base or a traffic port number, a protocol type of the traffic P1 and a protocol type of the traffic P2, and wherein determining whether the networking role of the internal network device is the client or the server by comparing the size of the traffic P1 and the size of the traffic P2 comprises:

determining that the networking role of the internal network device is the client when the size of the traffic P1 is greater than the size of the traffic P2 and the protocol type of the traffic P2 is a protocol type corresponding to the server; and determining that the networking role of the internal network device is the server when the size of the traffic P1 is smaller than or equal to the size of the traffic P2 and the protocol type of the traffic P1 is the protocol type corresponding to the server.

7. The method according to claim 1, wherein when the networking role of the internal network device is the client, constructing the simplified IPS signature rule base according to the networking role of the internal network device comprises setting a signature rule corresponding to the server in the full IPS signature rule base to a deactivated state, and wherein when the networking role of the internal network device is the server, constructing the simplified IPS signature rule base according to the networking role of the internal network device comprises setting a signature rule corresponding to the client in the full IPS signature rule base to the deactivated state.

8. A network security device deployed between an internal network device and an external network device to protect security of the internal network device, wherein the networking role of the internal network device comprises one of a server and a client, wherein the external network device is a client accessing a service provided by the internal network device when the networking role played by the internal network device is the server, wherein the external network device is a server providing the service accessed by the internal network device when the networking role played by the internal network device is the client, wherein the network security device comprises at least one processor and a memory coupled to the at least one processor, and wherein the at least one processor is configured to:
- perform statistical processing on traffic information that flows through the network security device;
- obtain traffic characteristic information from the statistical processing on the traffic information that flows through the network security device, wherein the traffic characteristic information comprises traffic P1 flowing from an internal network to an external network and traffic P2 flowing from the external network to the internal network;
- determine whether the networking role of the internal network device is the client or the server by comparing a size of the traffic P1 and a size of the traffic P2;
- construct a simplified IPS signature rule base from a full IPS signature rule base of the network security device according to the networking role of the internal network device, wherein the full IPS signature rule base includes signature rules pertaining to the networking role of the internal network device and signature rules not pertaining to the networking role of the internal network device, and wherein the simplified IPS signature rule base contains only the signature rules pertaining to the networking role of the internal network device;
- generate a state machine according to signature rules in the simplified IPS signature rule base; and
- perform IPS detection by applying the state machine to traffic that flows through the network security device, wherein the traffic comprises traffic sent from the internal network device to the external network device and traffic sent from the external network device to the internal network device.

9. The device according to claim 8, wherein the at least one processor is further configured to:
- set a signature rule corresponding to the server in the full IPS signature rule base to a deactivated state when the networking role of the internal network device is the client; and
- set a signature rule corresponding to the client in the full IPS signature rule base to the deactivated state when the networking role of the internal network device is the server.

10. The device according to claim 8, wherein the at least one processor is further configured to:
- determine an internal network interface and an external network interface according to security zone configuration information;
- perform the statistical processing on traffic flowing in from the internal network interface and flowing out from the external network interface to obtain the traffic P1; and
- perform the statistical processing on traffic flowing in from the external network interface and flowing out from the internal network interface to obtain the traffic P2.

11. The device according to claim 10, wherein the at least one processor is configured to:
- determine that the networking role of the internal network device is the client when the size of the traffic P1 is greater than the size of the traffic P2; and
- determine that the networking role of the internal network device is the server when the size of the traffic P1 is smaller than or equal to the size of the traffic P2.

12. The device according to claim 10, the at least one processor is further configured to:
- determine, according to protocol characteristic information stored in the protocol characteristic base or a traffic port number, a protocol type of the traffic P1 and a protocol type of the traffic P2;
- determine that the networking role of the internal network device is the client when the size of the traffic P1 is greater than the size of the traffic P2 and the protocol type of the traffic P2 is a file transfer protocol; and
- determine that the networking role of the internal network device is the server when the size of the traffic P1 is smaller than or equal to the size of the traffic P2 and the protocol type of the traffic P1 is the file transfer protocol.

13. The device according to claim 8, wherein the at least one processor is configured to:
- determine that the networking role of the internal network device is the client when the size of the traffic P1 is greater than the size of the traffic P2; and
- determine that the networking role of the internal network device is the server when the size of the traffic P1 is smaller than or equal to the size of the traffic P2.

14. The device according to claim 8, the at least one processor is further configured to:
- determine, according to protocol characteristic information stored in the protocol characteristic base or a traffic port number, a protocol type of the traffic P1 and a protocol type of the traffic P2;
- determine that the networking role of the internal network device is the client when the size of the traffic P1 is greater than the size of the traffic P2 and the protocol type of the traffic P2 is a file transfer protocol; and
- determine that the networking role of the internal network device is the server when the size of the traffic P1 is smaller than or equal to the size of the traffic P2 and the protocol type of the traffic P1 is the file transfer protocol.

15. A network security system, comprising:
- an internal network device;
- an external network device; and
- a network security device deployed between the internal network device and the external network device to protect security of the internal network device,
- wherein the networking role of the internal network device comprises one of a server and a client, wherein the external network device is a client accessing a service provided by the internal network device when the networking role played by the internal network device is the server, the external network device is a server providing the service accessed by the internal network device when the networking role played by the network device is the client, and wherein the network security device comprises a memory and a processor coupled to the memory and configured to:
- perform statistical processing on traffic information that flows through the network security device;
- obtain traffic characteristic information from the statistical processing on the traffic information that flows through the network security device, wherein the traffic characteristic information comprises traffic P1 flowing from an internal network to an external network and traffic P2 flowing from the external network to the internal network;
- determine whether the networking role of the internal network device is the client or the server by comparing a size of the traffic P1 and a size of the traffic P2;
- construct, from a full IPS signature rule base of the network security device, a simplified IPS signature rule base according to the networking rote of the internal network device, wherein the IPS signature rule base includes signature rules pertaining to the networking role of the internal network device and signature rules not pertaining to the networking role of the internal network device, and wherein the simplified IPS signature rule base contains only the signature rules pertaining to the networking role of the internal network device;

generate a state machine according to signature rules in the simplified IPS signature rule base; and perform IPS detection by applying the state machine to traffic that flows through the network security device.

16. The network security system of claim 15, wherein the network security system further comprises a protocol characteristic base configured to store protocol characteristic information of protocols, and wherein the processor is further configured to:

determine, according to the protocol characteristic information stored in the protocol characteristic base or a traffic port number, a protocol type of the traffic P1 and a protocol type of the traffic P2;

determine that the internal network device is the client when the size of the traffic P1 is greater than the size of the traffic P2 and the protocol type of the traffic P2 is a file transfer protocol; and determine that the internal network device is the server when the size of the traffic P1 is smaller than or equal to the size of the traffic P2 and the protocol type of the traffic P1 is the file transfer protocol.

* * * * *